United States Patent [19]
Penttila et al.

[11] Patent Number: 6,001,202
[45] Date of Patent: Dec. 14, 1999

[54] METHOD FOR ATTACHING A FASTENER TO A SURFACE TREATING ARTICLE, AND SUCH AN ARTICLE HAVING A FASTENER

[75] Inventors: Kenneth L. Penttila, Inver Grove Heights; Mandel L. Desnick, St. Louis Park, both of Minn.; Gerald R. Porter, Prairie du Chien, Wis.

[73] Assignee: 3M Innovative Properties Company, St. Paul, Minn.

[21] Appl. No.: 09/275,344

[22] Filed: Mar. 24, 1999

Related U.S. Application Data

[62] Division of application No. 08/834,268, Apr. 15, 1997, Pat. No. 5,931,729.

[51] Int. Cl.[6] ................................. B29C 65/06
[52] U.S. Cl. ................. 156/73.5; 156/309.6; 264/68
[58] Field of Search ................. 156/73.5, 308.2, 156/309.6, 580; 264/68

[56] References Cited

U.S. PATENT DOCUMENTS

| | | | |
|---|---|---|---|
| 2,717,437 | 9/1955 | Mestral | 28/72 |
| 3,468,732 | 9/1969 | Hewitt | 156/73 |
| 3,539,436 | 11/1970 | Hamano | 161/89 |
| 3,562,968 | 2/1971 | Johnson et al. | 51/389 |
| 3,580,793 | 5/1971 | Hewitt | 156/579 |
| 3,653,857 | 4/1972 | Field | 51/358 |
| 3,688,453 | 9/1972 | Legacy et al. | 51/400 |
| 3,822,821 | 7/1974 | Clarke | 228/2 |
| 3,851,357 | 12/1974 | Ribich et al. | 24/73 |
| 4,075,820 | 2/1978 | Standley | 53/329 |
| 4,353,761 | 10/1982 | Woerz et al. | 156/69 |
| 4,457,795 | 7/1984 | Mason et al. | 156/73.5 |
| 4,477,307 | 10/1984 | Cearlock et al. | 156/580 |
| 4,551,189 | 11/1985 | Peterson | 156/73.5 |
| 4,599,768 | 7/1986 | Doyle et al. | 24/590 |
| 4,636,124 | 1/1987 | Gugle et al. | 411/82 |
| 4,780,035 | 10/1988 | Shibayama et al. | 411/171 |
| 4,824,304 | 4/1989 | Shibayama et al. | 411/171 |
| 4,832,549 | 5/1989 | Shibayama et al. | 411/171 |
| 5,026,445 | 6/1991 | Mainolfi et al. | 156/73.5 |
| 5,064,485 | 11/1991 | Smith et al. | 156/69 |
| 5,108,539 | 4/1992 | Kelley et al. | 156/580 |
| 5,238,521 | 8/1993 | Cheung et al. | 156/502 |
| 5,297,366 | 3/1994 | Huddleston | 51/376 |
| 5,350,472 | 9/1994 | Koblella | 156/157 |
| 5,468,335 | 11/1995 | Mainolfi et al. | 156/580.2 |
| 5,593,120 | 1/1997 | Hamerski | 248/205.3 |

FOREIGN PATENT DOCUMENTS

| | | | |
|---|---|---|---|
| 42 10 066 C1 | 3/1992 | Germany | B29C 45/14 |
| 2 061 183 | 10/1979 | United Kingdom | B29C 27/08 |

OTHER PUBLICATIONS

Welding Of Plastics by J. Alex Neumann and Frank J. Bockhoff, Reinhold Publishing Corporation, New York, pp. 99–109.

Brochure, "*Introducing the Roloc® Disc System From 3M*".

Brochure "*Scotch–Brite™ and Roloc™ Surface Conditioning Discs*" from 3M Abrasive Systems Division, 3M Center Building 223–6S–03, St. Paul, MN 55144.

Brochure "*PMA SPINWELD 90*" from Powell, McGee Associates, Inc., 4599 Chatsworth ST N, Shoreview MN 55126.

Brochure "3M Roloc® Disca and Roloc® Disc Pads".

International Search Report –PCT/US97/14716.

*Primary Examiner*—James Sells
*Attorney, Agent, or Firm*—James J. Trussell

[57] ABSTRACT

A method of spin welding a fastener to an article and such an article. In a preferred mode, a method of spin welding a fastener to a surface conditioning treating article is disclosed. The fastener comprises a generally planar base including a first side, a second side, and a drive member extending from the second side. The surface treating article comprises a working surface adapted to treat a workpiece surface, and a back surface, the back surface comprising an open woven scrim. The first side of the fastener base is melt-bonded by the spin weld method to the open woven scrim of the surface treating article.

13 Claims, 2 Drawing Sheets

METHOD FOR ATTACHING A FASTENER TO A SURFACE TREATING ARTICLE, AND SUCH AN ARTICLE HAVING A FASTENER

This is a divisional of Application No. 08/834,268 filed Apr. 15, 1997 U.S. Pat. No. 5,931,729.

TECHNICAL FIELD

The present invention relates generally to a method of spin welding a fastener to an article and such an article, and more particularly to a method of spin welding a fastener to a surface conditioning disc and such a disc.

BACKGROUND OF THE INVENTION

U.S. Pat. No. 3,562,968 to Johnson et al. discloses a surface treating tool providing for easy installation of the surface treating article. The surface treating article has adhered thereto a drive button that engages a complementary cylindrical opening in a drive assembly comprising a back-up pad which is driven by a driving means. The adhesively-bonded drive button provides for quick and easy attachment and removal of surface treating elements without special mounting tools.

Surface conditioning discs having a threaded male button bonded to the back side of the disc by an adhesive are available commercially as Roloc™ surface conditioning discs from Minnesota Mining and Manufacturing Company, St. Paul, Minn. These surface conditioning discs have on the front side a conformable, three-dimensional non-woven open web material formed of synthetic fibers and abrasive particles. This web is needle tacked to an open weave scrim backing. U.S. Pat. No. 3,688,453 to Legacy et al. describes abrasive articles which comprise a lofty non-woven web needle tacked to a woven backing and impregnated with resin and abrasive.

Various methods and apparatus for spin welding articles are known in the art. For example, U.S. Pat. No. 3,851,357, "Fastener," (Ribich et al.) discloses a fastening structure and method of making same which comprises a fastener member having a base element and a plurality of hooking elements projecting from one surface of the base element. The fastening structure also comprises a snap fastening member having a base member and a holding means protruding centrally from one side of the base member for attaching the snap fastening member to a mounting plate. The fastening member and snap fastening member are secured together in a melt-bonded relationship. In the preferred embodiment of Ribich et al., the hook-type hooking elements and base element of the fastening member are molded of a thermoplastic material as an integral unit. Ribich et al. states that alternatively, the fastening tape member may comprise a woven or knitted thermoplastic material such as described in U.S. Pat. No. 2,717,437, "Velvet Type Fabric and Method of Producing Same," (De Mestral) or in U.S. Pat. No. 3,539,436, "Knitted Product Having a Material-Engaging Surface," (Hamano).

Although the commercial success of available surface treating articles which include a drive button as described above has been impressive, it is desirable to provide an economical button attachment process which is faster and eliminates the need for a separate adhesive.

SUMMARY OF THE INVENTION

One aspect of the present invention provides a method for attaching a fastener to a surface treating article. The fastener comprises a generally planar base including a first side, a second side, and a drive member extending from the second side. The surface treating article comprises a working surface adapted to treat a workpiece surface, and a back surface, the back surface comprising an open woven scrim backing having at least 5% open area. The method comprises the steps of a) inducing relative rotation between the fastener and the surface treating article; b) contacting the first side of the fastener and the scrim backing together under pressure; c) maintaining relative rotation and pressure between the fastener and scrim backing sufficient to cause the fastener and scrim backing to become melt-bonded together; and d) thereafter stopping the relative rotation between the fastener and the surface treating article.

Another aspect of the present invention provides a method for attaching a fastener to a woven scrim. The fastener comprises a generally planar base including a first side, a second side, and an drive member extending from the second side. The woven scrim has at least 5% open area. The method comprises the steps of: a) inducing relative rotation between the fastener and the woven scrim; b) while there is relative rotation between the fastener and the woven scrim, contacting the first side of the fastener and the woven scrim together under pressure; c) maintaining relative rotation and pressure between the fastener and woven scrim sufficient to cause the fastener and woven scrim to become melt-bonded together; and d) thereafter stopping the relative rotation between the fastener and the woven scrim.

Another aspect of the present invention provides a surface treating article. The surface treating article comprises a surface conditioning disc including a working surface adapted to treat a workpiece surface, and a back surface, the back surface comprising an open woven scrim backing having at least 5% open area; and a fastener including a generally planar base including a first side, a second side opposite said first side, and a drive member extending from the second side. The first side of the fastener and the scrim backing are melt-bonded together.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
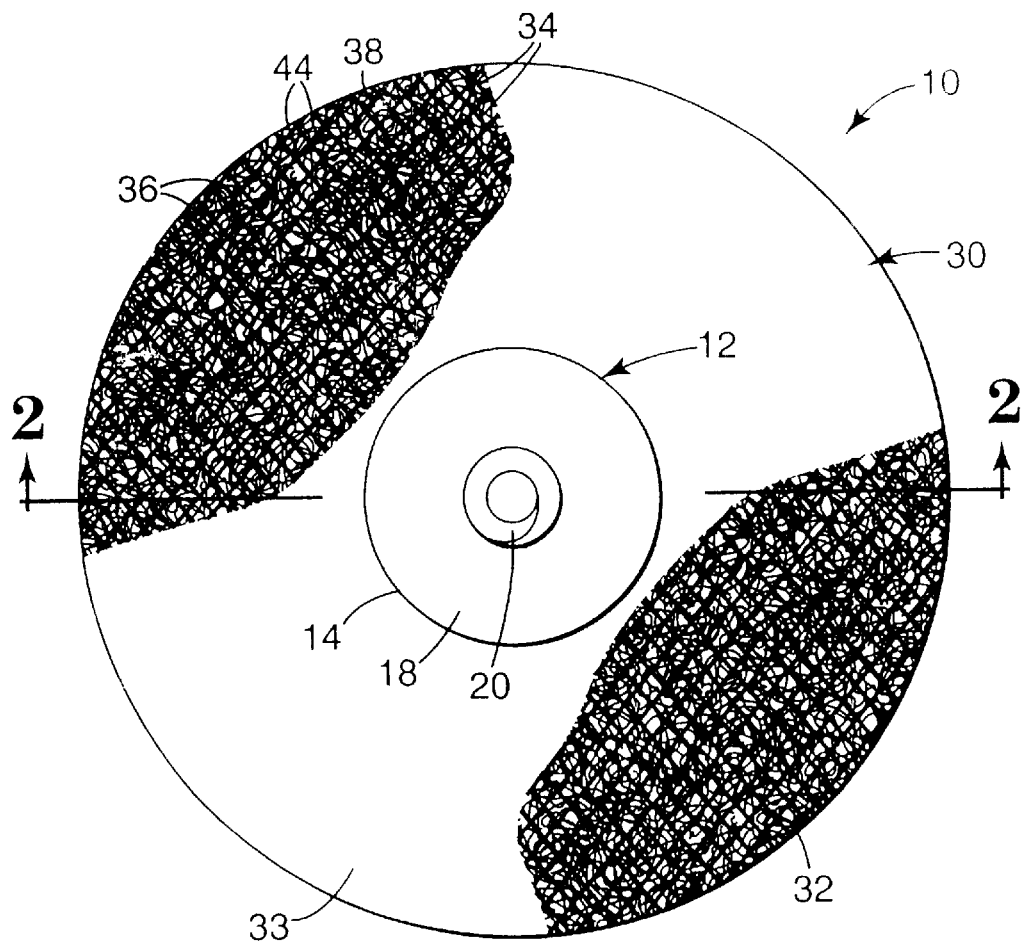
FIG. 1 is a plan view of a preferred embodiment of a surface treating article according to the present invention.

A preferred embodiment of a surface treating article 10 of the present invention is illustrated in FIG. 1. The surface treating article 10 includes surface conditioning disc 30 having fastener 12 attached thereto. The fastener 12 is melt-bonded to the back of the surface conditioning disc. The preferred spin welding method for achieving a melt-bond between the fastener 12 and surface conditioning disc 30 is described below.

Fastener 12 includes a generally planar base 14. The base 14 includes a first side 16 that is spin welded to the surface conditioning disc 30 so as to melt-bond the fastener 12 to the disc. The first side 16 of the fastener base is preferably smooth and planar so as to provide sufficient surface area to achieve the desired strength of the melt bond. It is also preferred that the base 14 of the fastener is circular. In one preferred embodiment, the base 14 of the fastener 12 has a diameter of approximately 3 cm (1.2 in), although larger and smaller fasteners are within the scope of the invention. Opposite to first side 16 of the base 14 is second side 18. As illustrated, second side 18 tapers toward the outer edge of the base 12. Extending from the center of the second side 18 is drive member 20. Drive member 20 is configured for attaching the surface treating article 10 to a desired power tool. In a preferred embodiment, the drive member 20 is a threaded stud which fits with a corresponding female threaded back-up pad (not illustrated). A suitable back-up pad is available commercially as a Roloc™ disc pad from Minnesota Mining and Manufacturing Company, St. Paul, Minn.

The fastener 12 may comprise any polymeric material that has the appropriate melt, flow, and adhesion characteristics to become securely melt-bonded to the surface treating article by an appropriate spin welding process. Typically, useful polymeric materials will be thermoplastic in nature. Additionally, thermosetting polymeric materials may be employed if they are only lightly crosslinked or have a stable intermediate or "B-stage" state and therefore can be caused to flow under heat and pressure. Examples of such thermoplastic polymeric materials include polyamides, polyesters, copolyamides, copolyesters, polyimides, polysulfone, and polyolefins. An example of a suitable thermosetting polymeric material is a novolak molding powder. Of these, thermoplastics are preferred, and of the thermoplastics, polyamides are preferred, with poly(hexamethylene adipamide) (nylon 6,6) being most preferred. The polymeric material may optionally include colorants, fillers, process aids, and reinforcing agents. Examples of colorants include pigments and dyes. Examples of fillers include, glass bubbles or spheres, particulate calcium carbonate, mica, and the like. Process aids may be materials such as lithium stearate, zinc stearate, and fluoropolymer materials that are known to enhance the flow characteristics of molten polymeric materials. Reinforcing agents may include glass fiber, carbon fiber, and metal fiber, all at levels up to about 50% by weight. If reinforcement agent is used, the preferred filler content is 30 to 45% by weight glass fiber. The drive button may be made by any process known to one skilled in the art of plastic article manufacture. These include but are not limited to injection molding, reaction injection molding, and conventional machining. Preferred is injection molding. A preferred drive button is disclosed in U.S. Pat. No. 3,562, 968, "Surface Treating Tool," Johnson et al., the entire disclosure of which is incorporated herein.

In a preferred embodiment, the surface treating article 10 has a nonwoven abrasive surface conditioning disc 30 as the abrasive component of the article. It is also possible for the surface treating article of the present invention to be a coated abrasive disc, a polishing pad, a brush, or similar surface treating element. The term "abrasive" must be considered relative to the targeted workpiece and the intended effect, and commonly-used abrasive particles may or may not be present in the surface treating element, as, for example, in a fine polishing operation. Surface treating elements have a working surface and backing surface. The driving button is attached centrally to the backing surface.

The preferred surface treating article is a nonwoven abrasive surface conditioning disc 30, such as is commercially available from Minnesota Mining and Manufacturing Company, St. Paul, Minn., under the trade designation "SCOTCH-BRITE" A-CRS Surface Conditioning Disc. The working surface 31 of such discs preferably comprises a lofty nonwoven web 40 of nylon 6,6 staple fibers 42 that has been needle punched through a reinforcing woven nylon scrim backing 32. Preferably, that about 40% of the staple fibers 42 of the web protrude through interstices 38 formed by the warp yarns 34 and fill yarns 36 of the woven scrim 32 to attach the nonwoven web 40 and the woven scrim 32 together. The needle tacked fibers which penetrate through the woven scrim 32 are illustrated as 44. The remaining fibers 42 remain on the working surface side of the surface conditioning disc 30. In addition, there are coatings of hard, thermosetting resins and abrasive particles on the lofty nonwoven web 40. A preferred surface conditioning article is described in detail in U.S. Pat. No. 3,688,453, "Abrasive Articles," Legacy et al., the entire disclosure of which is incorporated herein.

Figure 2:
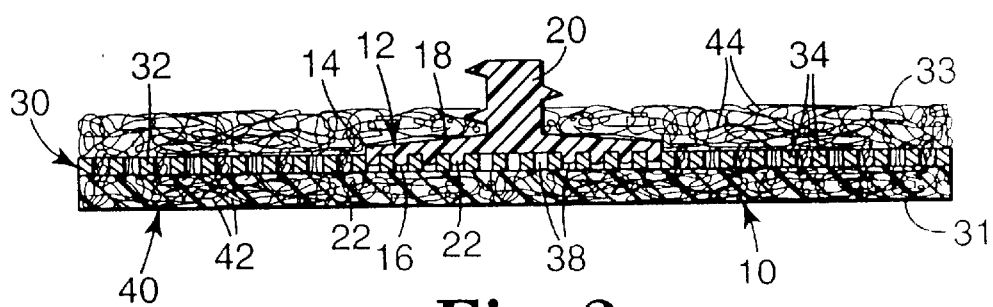
FIG. 2 is a cross-section of the surface treating article of FIG. 1 taken along line 2—2.

In one preferred embodiment illustrated in FIG. 2, the melt-bond obtained by spin welding is primarily obtained by softening the first side 16 of fastener base 12. The softened material of the fastener is forced under pressure to penetrate at 22 into a plurality of the interstices 38 of the woven scrim 32. Because the linear speed caused by the rotation of the fastener 12 is greater at the outer diameter of the base 14, the frictional temperatures at the outer diameter are greatest. Accordingly, the material of the fastener is sufficiently softened at the outer diameter portion of the first side 16 of the fastener base 14. This allows the fastener material 22 at the outer portion of the base 14 to bond at least partially around the yarns 34, 36 of the woven scrim 32, and to at least partially penetrate the interstices 38 in the woven scrim. This material 22, upon hardening, provides a strong mechanical bond between the fastener 12 and the scrim 32. Additionally, the material of the woven scrim may soften during spin welding to melt bond with the fastener 12. At the center of the base 14, where rotation causes a smaller linear speed, the frictional heat is less, and the first side 16 of the fastener base may not sufficiently soften to obtain penetration of fastener material 22 into the interstices of the woven scrim 32.

To achieve a secure mechanical bond at the melt-bond interface, it is preferred that the woven scrim backing is an open weave. To achieve such a backing, it is preferable that the woven scrim comprise at least 5 warp yarns per inch and 5 fill yarns per inch, and more preferably about 16 warp yarns and fill yarns per inch. The preferred yarns are at least 100 denier, and more preferably approximately 840 denier. A yarn may be one or more fibers that act as or are treated as one unit. A yarn may be continuous filament or "spun" (aligned and twisted) from staple into a unified bundle. A yarn may be multifilament (more than one continuous filament) or monofilament. The open area between the warp anld well fibers is preferably at least 5% of the total area of the scrim, and more preferable approximately 30%.

A preferred method for spin welding the fastener 12 to the surface conditioning disc 30 will now be described. The following parameters are particularly well suited for spin welding together the following constructions of the fastener 12 and surface conditioning disc 30. The fastener 12 preferably has a 3 cm diameter base 14 and is injection molded from nylon 6,6 having up to 45% by weight reinforcing glass fibers. The scrim 32 preferably includes sixteen warp yarns 34 per inch and sixteen fill yarns 36 per inch. The yarns 34, 36 are preferably 840 denier multifilament nylon yarns. The scrim 32 preferably includes a PVC coating to maintain the weave. Non-woven web 40 comprises nylon 6,6 staple fibers 42 needle tacked to the scrim 32 such that approximately 40% of the fibers 44 extend through the interstices 38 of the woven scrim 30. In addition, there are coatings of hard, thermosetting resins and abrasive particles applied to the working side 31 of the lofty nonwoven web 40. Resins, such as polyurethanes, may be exposed to the back side 33 of the surface conditioning article. After the article is cured, it is converted into individual surface conditioning discs.

Figure 3:
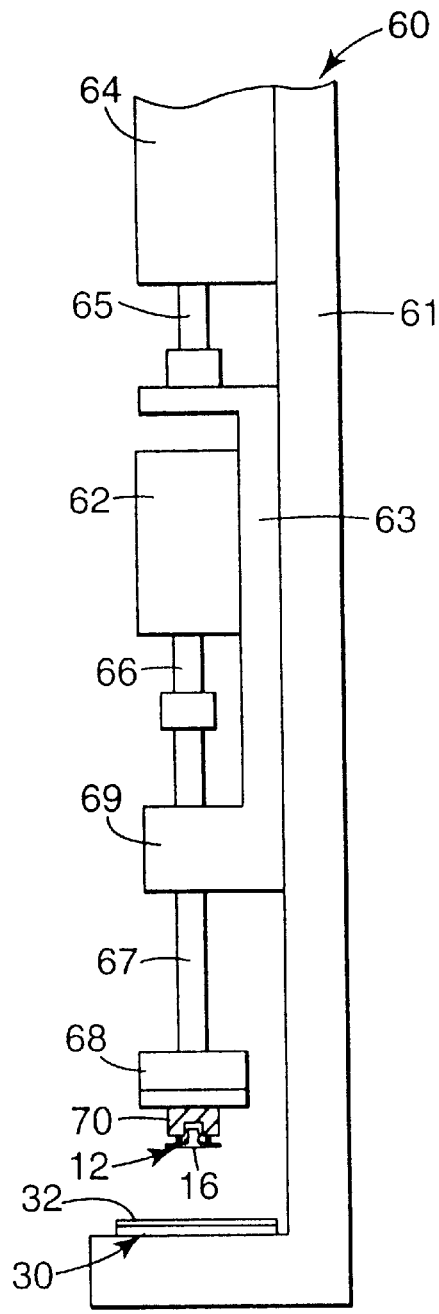
FIG. 3 is a partially schematic view of a preferred apparatus for carrying out the method of the present invention prior to contacting the faster and abrasive article.

FIG. 3 illustrates schematically an apparatus 60 for spin welding the fastener 12 and surface conditioning disc 30 together. Apparatus 60 includes a frame 61 to which a motor 62 and drive mechanism 64 are mounted. In a preferred embodiment, the drive mechanism 64 is an air cylinder. The motor 62 is mounted via a slidable frame 63 to allow the slidable frame 63 and motor 62 to be driven vertically by the rod 65 extending from the air cylinder 64. Rod 65 is attached to the slidable frame 63 so as to raise and lower the slidable frame in response to actuating the cylinder 64. Extending from the motor 62 is a first shaft 66. The first shaft is coupled to a second shaft 67. In the illustrated embodiment, an optional flywheel 68 is mounted to the distal end of the second shaft 67. Also mounted at the distal end of the shaft is a fixture 70 for holding the fastener 12. The second shaft may optionally pass through bearing support 69 which extends from the slidable frame 63. It is thus seen that the motor 62 drives first shaft 66, second shaft 67, optional flywheel 68 and fixture 70; and that all of these components are raised and lowered together with slidable frame 63 in response to actuating the cylinder 64.

Figure 4:
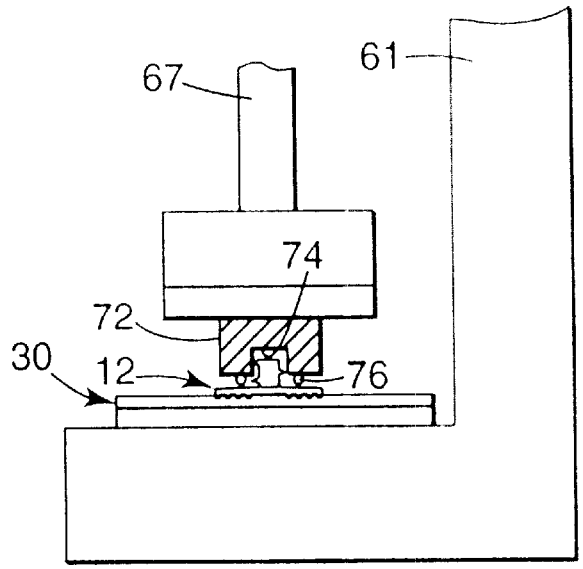
FIG. 4 is a view of a portion of the apparatus of FIG. 3, illustrating the fastener in contact with the surface treating article.

Fixture 70 can be any suitable fixture that will hold the fastener 12 during the spin weld operation. Fixture 70 must grip the fastener 12 securely enough to avoid slippage of the fastener 12 within the fixture 70 when the fastener is spun against the surface conditioning disc 30. Fixture 70 should also provide for easy release of the fastener 12 after the spin weld process. Fixture 70 thus may include moveable elements for gripping and releasing the fastener 12 as is well known in the art. In the embodiment illustrated in FIG. 4, the fixture 70 includes a fixture body 72 having a cavity 74 therein. The cavity is sized to receive the threaded stud 20 of the fastener. Cavity 74 may optionally be threaded for mating with the fastener threaded stud 20. Alternatively, cavity 74 may include moveable elements (not illustrated) for gripping and releasing the threaded stud 20. Fixture 70 optionally includes an o-ring 76. O-ring 76 engages with the second side 18 of the fastener base 14. 0-ring 76 is particularly preferred when there are no moveable elements in the fixture 70 for grabbing and releasing the threaded stud 20. This helps eliminate slippage between the fastener 12 and fixture 70 during the spin welding. Alternatively, the face of the fixture 70 which comes into contact with the second side 18 of the fastener base can be rough or textured to minimize slippage between the fixture and the fastener during spin welding. Whatever such arrangement is used, care should be taken so as not to damage the threaded stud 20 or the fastener 12 during spin welding.

The surface treating article 30 may be clamped or otherwise mechanically held to the frame 60 to keep the disc 30 from rotating during spin welding. Alternatively, there may be a frictional surface on the frame 60 against which the working surface 31 of the non-woven web 40 rests to prevent the disc 30 from rotating during spin welding. Any suitable methods for loading the fastener 12 and surface treating disc 30 before spin welding and unloading after spin welding may be provided for and would not be expected to affect the spin weld itself or the strength of the melt-bond.

For preferred embodiment of articles described above, a preferred method of spin welding the fastener 12 to the surface conditioning disc 30 is as follows. In general, the spin weld method comprises the steps of holding stationary the surface conditioning disc 30, mounting the fastener 12 in a suitable fixture 70 to be driven by the spin weld apparatus 60, accelerating the fixture 70 and fastener 12 to the desired rotational speed, activating the drive mechanism 64 to move the first side 16 of the fastener base 14 into contact with back side 33 of the woven scrim 32, applying sufficient force between the fastener and scrim while the fastener is spinning to soften at least one of the fastener 12 and scrim 32, allowing the fixture 70 and fastener 12 motor 62 to stop rotation, maintaining force between the fastener and scrim while the softened material sufficiently hardens, and removing the fastener 12 from the fixture 70 and releasing the surface conditioning disc 30.

Any commercially available spin welding apparatus 60 capable of obtaining the conditions described herein may be used, such as the PMA Spinweld 90 available from Powell, McGee Associates, Inc., of Shoreview, Minn. Another suitable apparatus includes an Allen-Bradley servo motor model number 1326AB-B410J-21 or model number 1326AS-B330H-21, with a 1394-AM04 axis module, all available from Allen-Bradley Company, Inc. located in Milwaukee, Wis.

Preferably, the spin weld apparatus is operated in a mode that removes power from the motor 62 after the fastener and scrim are brought into contact under pressure, allowing the friction between the fastener and scrim to bring the rotating fastener to a stop. Alternatively, rotation of the fixture 70 and fastener 12 can be resistance stopped.

The parameters found to affect the strength of the melt-bond between the fastener 12 and surface conditioning disc 30 are as follows. These parameters are provided for a spin weld apparatus 60 having a system inertia of approximately 40 ounce-inches$^2$ used to fasten the preferred embodiments of the fastener 12 and surface conditioning disc 30 described herein. The force that the cylinder 64 applies to the system is preferably between about 125 and 1257 lb. (10 to 100 psi for a 4 inch diameter cylinder), more preferably between about 188 and 628 lb. (15 to 50 psi), and most preferably between about 375 and 628 lb. (30 to 50 psi). The speed of the motor 64 is preferably from about 3300 and 5700 RPM. The spin time is preferably between about 0.28 seconds and 0.38 seconds. The spin time is a measurement of how long the motor 62 is maintained under power from the time the solenoid valve is signaled to apply air pressure for the cylinder to move the fixture 70 and fastener 12 towards the scrim (a travel distance of from approximately 1/8 inch to 13/16 inch), and ends with the command to remove power from the motor 62 after the fastener 12 contacts the scrim. A useful parameter for determining a suitable bond strengths is the speed of the motor (RPM) multiplied by the spin time (seconds). It has been determined that this parameter should be above a desired minimum to obtain the desired bond strength. Increasing the parameter beyond the desired minimum shifts the failure mode from release of the melt-bond to breakage of the threaded stud. Therefore, increasing this parameter above the switch-over point of the failure mode does not significantly increase the overall strength of the surface treating article. For fastening the preferred embodiments of the elements described above, it is preferred that (RPM)×(spin time) be between about 1254 and 2166.

It has been found that, within a given range of rotation speed and spin time, the cylinder 64 should maintain the fastener 12 in contact with the scrim 32 with at least a minimum preferred force to obtain a desired melt-bonded force between the scrim and fastener, and that increasing force shifts the release mode from release of the melt bond to breakage of the threaded stud. Therefore, increasing the force to beyond the point at witch the release mode switches does not significantly increase the overall strength of the surface treating article. The preferred force for the preferred embodiments of the fasteners 12 and surface treating discs 30 described herein is from about 377 pounds to about 628 pounds.

The operation of the present invention will be further described with regard to the following detailed examples. These examples are offered to further illustrate the various specific and preferred embodiments and techniques. It should be understood, however, that many variations and modifications may be made while remaining within the scope of the present invention.

EXAMPLES

In each of the examples, a number of surface treating articles 10 were made by spin welding nylon 6,6 fasteners 12 with 33% by weight glass fibers, having a 3 cm diameter base 14 to the specified surface conditioning disc 30. The spin weld apparatus used had a system inertia of approximately 40 ounce-inches$^2$. In each example, a 2 inch diameter surface conditioning disc was held stationary. The motor 62 was accelerated to the specified RPM, and then the cylinder 64 was actuated with the indicated force to bring the fastener 12 into contact with the scrim 32 of the surface conditioning disc 30 (a travel distance of approximately $13/16$ inch). The power to the motor was removed at the end of the indicated spin time. The spin time indicates the time from actuating the cylinder 64 until the power was removed after the fastener and scrim were brought into contact. The spin time thus includes the sum of the travel time before contacting the fastener and scrim and the time the motor was under power upon contacting the fastener and scrim. Friction between the fastener 12 and the scrim 32 then stops rotation of the fastener 12.

EXAMPLE 1

Example 1 illustrates that for a given spin time and rotational speed, increasing cylinder pressure 64 beyond a desired minimum does not significantly increase the strength of the surface treating article. The fastener 12 was spin welded to a 2 inch diameter surface conditioning disc of the type available as A-Med surface conditioning discs from Minnesota Mining and Manufacturing Company, St. Paul, Minn. The spin time (as defined above) was 0.33 seconds. The spin weld speed was 4500 RPM. The force imparted by the cylinder 64 varied from 125 to 628 pounds. Tensile strength was determined by measuring the peak force observed in separating the melt-bonded fastener 12 from the surface conditioning disc 32. For cylinder force at or above 377 pounds, the failure mode changes from predominately spin weld release to predominately breakage of the threaded stud 20 from the base 14. Accordingly, at forces at or above 377 pounds, with the other parameters held constant, any increase in strength of the spin weld cannot be measured by this technique, and would not be expected to provide any improvement in overall strength of the surface treating article 10.

TABLE 1

| Number | Cylinder Force (Pounds) | Tensile Strength (Pounds) |
|---|---|---|
| 1 | 125 | 39.9 |
| 2 | 125 | 0.0 |
| 3 | 125 | 0.0 |
| 4 | 125 | 31.8 |
| 5 | 189 | 41.2 |
| 6 | 189 | 48.5 |
| 7 | 189 | 40.7 |
| 8 | 189 | 44.8 |
| 9 | 251 | 50.2 |
| 10 | 251 | 52.8 |
| 11 | 251 | 82.1 |
| 12 | 251 | 74.4 |
| 13 | 314 | 57.4 |
| 14 | 314 | 88.3 |
| 15 | 314 | 39.4 |
| 16 | 314 | 90.9 |
| 17 | 377 | 101.1 |
| 18 | 377 | 103.2 |
| 19 | 377 | 96.3 |
| 20 | 377 | 87.5 |
| 21 | 440 | 101.6 |
| 22 | 440 | 93.6 |
| 23 | 440 | 98.0 |
| 24 | 440 | 105.5 |
| 25 | 503 | 102.6 |
| 26 | 503 | 106.4 |
| 27 | 503 | 90.9 |
| 28 | 503 | 94.0 |
| 29 | 566 | 109.0 |
| 30 | 566 | 99.7 |
| 31 | 566 | 95.6 |
| 32 | 566 | 96.6 |
| 33 | 628 | 95.9 |
| 34 | 628 | 100.2 |
| 35 | 628 | 87.0 |
| 36 | 628 | 91.5 |

EXAMPLES 2–4

Examples 2–4 demonstrate that after a minimum desired level of (spin time)×(RPM) is obtained, the failure mode changes from predominately release of the spin weld bond to predominately breakage of the threaded stud 12 from the base 14 of the fastener. Therefore, increased spin weld strength above the change-over point cannot be measured by this technique. Furthermore, for all other parameters held constant, increasing this parameter would not be expected to significantly increase the overall strength of the surface treating article. For examples 2–4, for values of (spin time)×(RPM) at or above 1254, failure mode is breakage of the threaded stud.

For Example 2, the surface conditioning discs 30 were 2 inch diameter discs of the type available as A-VFN from Minnesota Mining and Manufacturing Company, St. Paul, Minn. For Example 3, the surface conditioning discs 30 were 2 inch diameter discs of the type available as A-MED from Minnesota Mining and Manufacturing Company, St. Paul, Minn. For Example 4, the surface conditioning discs 30 were 2 inch diameter discs of the type available as A-CRS from Minnesota Mining and Manufacturing Company, St. Paul, Minn. In each of Examples 2–4, the force imparted by cylinder 64 was 628 pounds. Tensile strength was determined by measuring the peak force observed in separating the melt-bonded fastener 12 from the surface conditioning disc 32. The results for Examples 2–4 are presented in Tables 2–4, respectively.

TABLE 2

| Number | Speed (RPM) | Spin Time (Sec.) | (speed) × (time) | Tensile Strength (lb.) |
|---|---|---|---|---|
| 1 | 3300 | .28 | 924 | 24.7 |
| 2 | 3300 | .28 | 924 | 16.9 |
| 3 | 3300 | .28 | 924 | 9.1 |
| 4 | 3300 | .28 | 924 | 18.4 |
| 5 | 3300 | .38 | 1254 | 67.8 |
| 6 | 3300 | .38 | 1254 | 66.4 |
| 7 | 3300 | .38 | 1254 | 65.9 |
| 8 | 3300 | .38 | 1254 | 65.4 |
| 9 | 4500 | .33 | 1485 | 73.0 |
| 10 | 4500 | .33 | 1485 | 71.0 |
| 11 | 4500 | .33 | 1485 | 69.4 |
| 12 | 4500 | .33 | 1485 | 73.4 |
| 13 | 5700 | .28 | 1596 | 69.1 |
| 14 | 5700 | .28 | 1596 | 68.2 |
| 15 | 5700 | .28 | 1596 | 68.4 |
| 16 | 5700 | .28 | 1596 | 73.0 |
| 17 | 5700 | .38 | 2166 | 71.7 |
| 18 | 5700 | .38 | 2166 | 66.1 |
| 19 | 5700 | .38 | 2166 | 66.0 |
| 20 | 5700 | .38 | 2166 | 74.4 |

TABLE 3

| Number | Speed (RPM) | Spin Time (Sec.) | (speed) × (time) | Tensile Strength (lb.) |
|---|---|---|---|---|
| 1 | 3300 | .28 | 924 | 22.9 |
| 2 | 3300 | .28 | 924 | 7.7 |
| 3 | 3300 | .28 | 924 | 9.0 |
| 4 | 3300 | .28 | 924 | 14.9 |
| 5 | 3300 | .38 | 1254 | 92.4 |
| 6 | 3300 | .38 | 1254 | 84.9 |
| 7 | 3300 | .38 | 1254 | 98.3 |
| 8 | 3300 | .38 | 1254 | 94.3 |
| 9 | 4500 | .33 | 1485 | 101.1 |
| 10 | 4500 | .33 | 1485 | 92.1 |
| 11 | 4500 | .33 | 1485 | 96.7 |
| 12 | 4500 | .33 | 1485 | 79.4 |
| 13 | 5700 | .28 | 1596 | 91.5 |
| 14 | 5700 | .28 | 1596 | 94.1 |
| 15 | 5700 | .28 | 1596 | 95.4 |
| 16 | 5700 | .28 | 1596 | 96.9 |
| 17 | 5700 | .38 | 2166 | 91.9 |
| 18 | 5700 | .38 | 2166 | 109.4 |
| 19 | 5700 | .38 | 2166 | 94.2 |
| 20 | 5700 | .38 | 2166 | 90.2 |

TABLE 4

| Number | Speed (RPM) | Spin Time (Sec.) | (speed) × (time) | Tensile Strength (lb.) |
|---|---|---|---|---|
| 1 | 3300 | .28 | 924 | 4.4 |
| 2 | 3300 | .28 | 924 | 11.5 |
| 3 | 3300 | .28 | 924 | 7.9 |
| 4 | 3300 | .28 | 924 | 12.1 |
| 5 | 3300 | .38 | 1254 | 112.7 |
| 6 | 3300 | .38 | 1254 | 108.6 |
| 7 | 3300 | .38 | 1254 | 102.6 |
| 8 | 3300 | .38 | 1254 | 107.0 |
| 9 | 4500 | .33 | 1485 | 110.0 |
| 10 | 4500 | .33 | 1485 | 111.3 |
| 11 | 4500 | .33 | 1485 | 104.3 |
| 12 | 4500 | .33 | 1485 | 91.5 |
| 13 | 5700 | .28 | 1596 | 69.2 |
| 14 | 5700 | .28 | 1596 | 96.9 |
| 15 | 5700 | .28 | 1596 | 69.4 |
| 16 | 5700 | .28 | 1596 | 82.8 |
| 17 | 5700 | .38 | 2166 | 111.4 |
| 18 | 5700 | .38 | 2166 | 103.9 |
| 19 | 5700 | .38 | 2166 | 108.5 |
| 20 | 5700 | .38 | 2166 | 99.2 |

The tests and test results described above are intended solely to be illustrative, rather than predictive, and variations in the testing procedure can be expected to yield different results.

The present invention has now been described with reference to several embodiments thereof The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the exact details and structures described herein, but rather by the structures and methods described by the language of the claims, and the equivalents of those structures.

What is claimed is:

1. A method for attaching a fastener to a surface treating article, comprising the steps of:
    a) inducing relative rotation between the fastener and the surface treating article,
        wherein the fastener comprises a generally planar base including a first side, a second side, and a drive member extending from the second side; and
        wherein the surface treating article comprises a working surface adapted to treat a workpiece surface, and a back surface, the back surface comprising an open woven scrim backing having at least 5% open area;
    b) contacting the first side of the fastener and the scrim backing together under pressure;
    c) maintaining relative rotation and pressure between the fastener and scrim backing sufficient to cause the fastener and scrim backing to become melt-bonded together; and
    d) thereafter stopping the relative rotation between the fastener and the surface treating article.

2. The method of claim 1, wherein the working surface of the surface treating article comprises a lofty non-woven web needle-tacked to the woven scrim backing, such that a portion of the fibers of the lofty non-woven web extends through the woven scrim.

3. The method of claim 1, wherein step c) causes the first surface of the fastener to soften and at least partially extend into the openings of the woven scrim backing.

4. The method of claim 3, wherein the fastener comprises a thermoplastic material.

5. The method of claim 4, wherein the fastener comprises nylon.

6. The method of claim 1, wherein the woven scrim backing comprises at least 5 multifilament warp yarns per inch and at least 5 multifilament fill yarns per inch.

7. The method of claim 6, wherein the multifilament warp yams and fill yarns comprise at least 100 denier.

8. The method of claim 1, wherein the woven scrim backing comprises approximately 16 multifilament warp yarns per inch and approximately 16 multifilament fill yams per inch, and wherein the multifilament warp yarns and fill yarns are approximately 840 denier.

9. The method of claim 8, wherein the fastener comprises nylon, wherein step a) comprises inducing a relative rotation of from 3300 and 5700 RPM, and wherein step b) comprises applying a force of between 375 and 628 pounds.

10. A method for attaching a fastener to a woven scrim, comprising the steps of:
   a) inducing relative rotation between the fastener and the woven scrim,
      wherein the fastener comprises a generally planar base including a first side, a second side, and an drive member extending from the second side; and
      wherein the woven scrim has at least 5% open area;
   b) while there is relative rotation between the fastener and the woven scrim, contacting the first side of the fastener and the woven scrim together under pressure;
   c) maintaining relative rotation and pressure between the fastener and woven scrim sufficient to cause the fastener and woven scrim to become melt-bonded together; and
   d) thereafter stopping the relative rotation between the fastener and the woven scrim.

11. The method of claim 10, wherein step c) causes the first surface of the fastener to soften and at least partially extend into the openings of the woven scrim.

12. The method of claim 11, wherein the fastener comprises a thermoplastic material.

13. The method of claim 12, wherein the fastener comprises nylon, wherein the woven scrim comprises approximately 16 multifilament warp yarns per inch and approximately 16 multifilament fill yarns per inch, and wherein the multifilament warp yarns and fill yarns are approximately 840 denier, and wherein step a) comprises inducing a relative rotation of from 3300 and 5700 RPM, and wherein step b) comprises applying a force of between 375 and 628 pounds.

* * * * *

UNITED STATES PATENT AND TRADEMARK OFFICE
CERTIFICATE OF CORRECTION

PATENT NO. : 6,001,202
DATED : December 14, 1999
INVENTOR(S) : Kenneth L. Penttila, Mandel L. Desnick, and Gerald R. Porter It is certified that error appears in the above-identified patent and that said Letters Patent is hereby corrected as shown below:

Column 10,
Line 62, "yams" should be -- yarns -- ; and
Line 65, "yams" should be -- yarns --.

Signed and Sealed this

Thirty-first Day of July, 2001

*Attest:*

*Attesting Officer*

NICHOLAS P. GODICI
*Acting Director of the United States Patent and Trademark Office*